Figure 1:
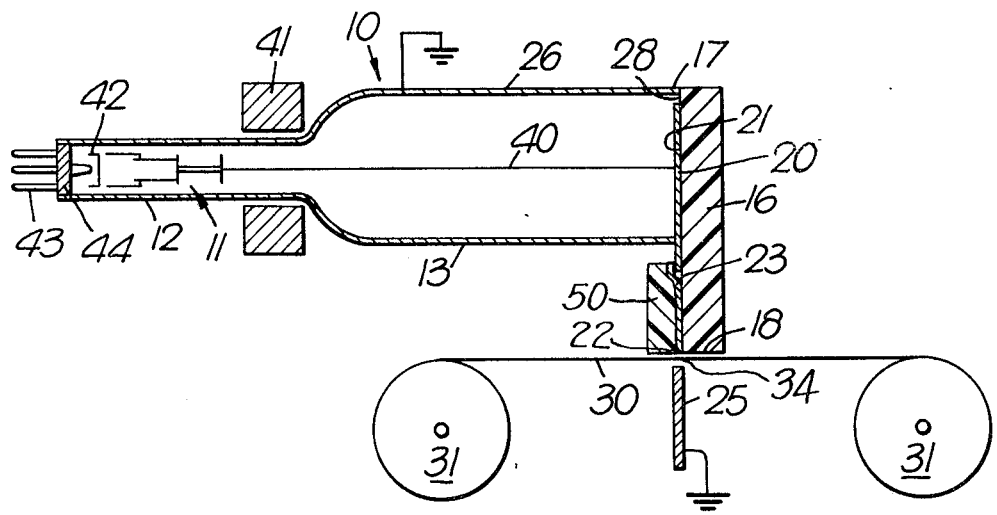

United States Patent [19]

Bennett

[11] 4,330,789
[45] May 18, 1982

[54] ELECTROSTATIC PRINTING APPARATUS INCLUDING AN ELECTRON BEAM TUBE

[75] Inventor: Maurice R. Bennett, Marple, England

[73] Assignee: Thorn EMI Limited, London, England

[21] Appl. No.: 127,528

[22] Filed: Mar. 5, 1980

[30] Foreign Application Priority Data

Mar. 6, 1979 [GB] United Kingdom ................ 7907912

[51] Int. Cl.³ ...................... G01D 15/06; H01J 31/02; H01J 9/00
[52] U.S. Cl. .................................. 346/161; 313/419; 29/25.17
[58] Field of Search ................ 346/161; 313/419, 369; 29/25.14, 25.17

[56] References Cited

U.S. PATENT DOCUMENTS

| | | | |
|---|---|---|---|
| 3,230,601 | 1/1966 | Wurtz | 313/419 X |
| 3,321,657 | 5/1967 | Granitsas et al. | 346/161 X |
| 3,458,752 | 7/1969 | Stowell | 346/161 X |
| 3,622,825 | 11/1971 | Bennett | 313/369 |
| 3,663,748 | 5/1972 | Boon | 346/161 X |

Primary Examiner—Aristotelis M. Psitos
Attorney, Agent, or Firm—Kerkam, Stowell, Kondracki & Clarke

[57] ABSTRACT

An electron beam tube assembly has a pattern of conductors 20 at least partially provided by being deposited on a major surface of a face plate 16, of the tube 13, the conductors to extend from within the tube 13, at least to an edge 18 of the face plate spaced from the remainder of the tube, and at the edge providing a plurality of exposed, spaced apart ends 22, comprising electrodes, the opposite end of each conductor being coupled by resistive material 28 deposited on the tube to a conductive coating 26 also on the tube, the coating being maintained at a high positive potential with respect to the cathode, in response to the information signals, supplied to the electron beam deflection means 41 and/or to the electron beam modulation means 42, electrical discharges occur to mark an associated sheet 30 of material sensitive to electrical discharges each such electrical discharge being when the electron beam impinges on a conductor.

12 Claims, 2 Drawing Figures

ELECTROSTATIC PRINTING APPARATUS INCLUDING AN ELECTRON BEAM TUBE

This invention relates to electron beam tube assemblies each arranged to provide, on sheets of sensitive material to move through the assembly, representations of information signals supplied to the assembly, and it is an object of the present invention to provide such an electron beam tube assembly with a simple and compact construction.

According to the present invention an electron beam tube assembly has a pattern of a plurality of discrete conductors at least partially provided by being deposited on one surface of the face plate, comprising part of the tube envelope, the conductor bearing surface of the face plate being secured to the remainder of the tube envelope, the conductors to extend from within the envelope of the electron beam tube at least to an edge of the face plate spaced from the remainder of the envelope, there being an array of exposed, spaced apart ends of the conductors beyond the remainder of the envelope, each conductor providing only one such exposed end, and each conductor is coupled to a point to be maintained at a high positive predetermined potential level, with respect to the cathode, by being coupled, via resistive material also deposited on the tube envelope, to a conductive coating provided on the tube envelope and to be maintained at the predetermined potential level, each exposed end of a conductor individually comprising one electrode of a pair of electrodes, there being a plurality of pairs of electrodes, with the exposed ends of different conductors being in different pairs of electrodes, and another, common electrode is provided for the different pairs of electrodes, the electrodes of each pair of electrodes are at least substantially uniformly spaced apart, and means is provided within the electron beam tube assembly to move an associated sheet of material sensitive to electrical discharges between each of the different pairs of electrodes, and the arrangement is such that the potential level of a conductor is changed from said predetermined potential level by the electron beam impinging thereon, and each such change in the potential level of a conductor causes an electrical discharge to occur between the pair of electrodes having as one electrode the exposed end of the conductor upon which the electron beam is impinging, such electrical discharges to occur between different pairs of electrodes to mark different parts of different adjacent portions of the moving sheet, in operation, with the sheet moving between each of the different pairs of electrodes, and in response to information signals supplied to the assembly, an electrical discharge to occur selectively between a pair of electrodes, and as the electron beam impinges on different parts of the face plate of the tube, with the electron beam impinging on different conductors of the pattern, electrical discharges to occur selectively between different pairs of electrodes, and in relation to each pair of electrodes individually, electrical discharges to occur between the pair of electrodes at different times, providing marks on the different corresponding parts of the different instantaneous adjacent portions of the moving sheet, the marks so provided on the sheet providing desired representations of the information signals supplied to the assembly.

It is convenient to arrange that said other, common electrode, and each conductor of the pattern upon which the electron beam is not impinging, each is to be maintained at a predetermined potential level, and conveniently each is to be maintained at substantially the same predetermined potential level, and this may be zero potential.

Thus, at least each conductor of the pattern may be coupled to the conductive coating, conventionally provided on the outside of the tube envelope, and to be maintained at zero potential, and the electron gun of the assembly is to be maintained at a high negative potential level.

It is not essential that the whole of the change of the potential level of a conductor, from the predetermined potential level, and obtained by the electron beam impinging thereon, is required to obtain the desired electrical discharge between the pair of electrodes having as one electrode the exposed end of the conductor; nor that the potential level of the conductor is changed to be the same as the potential level of the electron gun.

It is required that information signals of an appropriate form are employed within the assembly. Interface means may be provided within the assembly between the sources of the information signals and the remainder of the electron beam tube assembly, to ensure that the information signals supplied to the remainder of the assembly are of the appropriate form.

It is possible that the electron beam is capable of movement only in a straight line across the face plate.

The arrangement may be such that information signals are to be supplied to control the electron beam deflection means, and/or the electron beam modulation means, of the tube; and possibly also the means to move the sheets through the assembly. If information signals are to be supplied to the electron beam modulation means alone, the arrangement is required to be such that the electron beam is capable of scanning linearly across the face plate in a uniformly repetitive manner.

The face plate may provide a screen for the electron beam tube, a suitable phosphor being included in the screen, and a visible indication of the different instantaneous electron beam inpingement points on the screen being obtainable.

The parts of the conductors providing the exposed conductor ends may be of material more resistant to wear due to electrical discharges than the material of the remainder of the conductors; and/or these parts may be readily detachable from the remainder of the conductors, so that they are readily replaceable after wear due to electrical discharges, in such an arrangement the exposed conductor ends being beyond the edge, or edges, of the face plate to which the conductor extends.

Usually the face plate is at least substantially planar in form.

The array of spaced apart, exposed conductor ends of the pattern of conductors may extend at least substantially in a straight line, along an axis of the instantaneous adjacent portion of the associated sheet. The array of spaced apart conductor ends of the pattern of conductors may extend at least substantially transversely to the possible direction of movement of the instantaneous adjacent portion of the associated sheet. In any event, it is usual for at least the conductor parts providing the exposed conductor ends to extend at least substantially normal to the instantaneous adjacent portion of the sheet, and in particular, to the axis of the instantaneous adjacent portion of the sheet, if appropriate.

All the constituent conductors of the pattern may extend at least substantially parallel to each other. In any such arrangement the conductors may be arranged so that the electron beam cannot impinge on more than one conductor simultaneously.

Figure 2:
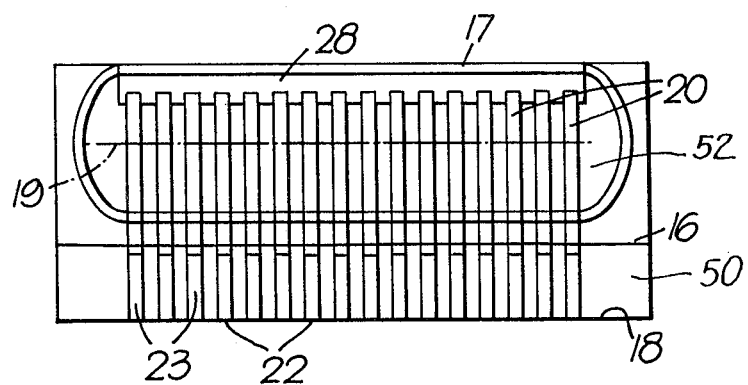

The present invention will now be described by way of example with reference to the accompanying drawings, in which:

FIG. 1 is a sectional elevation of one embodiment of an electron beam tube assembly in accordance with the present invention, together with an associated web of material sensitive to electrical discharges, and to move through the assembly, the assembly, in response to information signals, providing required representations of the information signals by marking the web with appropriate electrical discharges, and FIG. 2 is a front view of the face plate of the electron beam tube assembly of FIG. 1.

The illustrated electron beam tube assembly according to the present invention includes an electron beam tube 10, substantially of a known construction, having an electron gun 11 mounted within the neck 12 of a glass envelope 13. A planar face plate 16, also comprising part of the tube envelope 13, is provided, and the face plate 16 extends beyond the remainder of the envelope 13. As shown in FIG. 2, the part 17 of the envelope 13 abutting against the face plate 16, is substantially elliptical in section, and the face plate is rectangular in shape with one longitudinal edge 18 thereof spaced furthest from the envelope, and extends parallel to the longitudinal axis of symmetry 19 of the part 17 of the envelope.

A pattern of conductors 20 is deposited on the major surface 21 of the face plate 16 to co-operate with the part 17 of the envelope 13, for example, by the conductors 20 being printed on the surface 21. The pattern comprises a plurality of discrete conductors 20 extending parallel to each other, and uniformly spaced apart. In particular, the conductors 20 extend from within the tube 10 to the edge 18 of the face plate, there being exposed conductor ends 22 at the edge 18 of the face plate, the conductors extending normal to the edge 18. For convenience, the conductor parts providing the exposed conductor ends are considered to be the conductor parts 23, beyond the envelope 13.

The face plate 16 is bonded to the part 17 of the envelope 13 by a high temperature ceramic paste, and the envelope 13 is highly evacuated.

Each exposed conductor end 22 individually comprises one of a pair of electrodes, there being a plurality of pairs of electrodes, with the exposed ends of different conductors being in different pairs of electrodes. Another, common electrode 25 is provided for the different pairs of electrodes, and the other, common electrode 25 extends adjacent to, but spaced from, each exposed conductor end 22, and is at least substantially uniformly spaced from each exposed conductor end 22.

The arrangement is such that electrical discharges are to occur selectively between the different pairs of electrodes, and each such electrical discharge is to be caused by the electron beam within the tube impinging upon the conductor providing the exposed conductor end of the pair of electrodes with the electrical discharge therebetween. The impingement of the electron beam on the conductor causes the potential level of the conductor to change, to cause the desired electrical discharge. Thus, it is convenient to arrange that said other, common electrode 25, and each conductor of the pattern upon which the electron beam is not impinging, each is to be maintained at a predetermined potential level, and conveniently each is to be maintained at substantially the same predetermined potential. In the illustrated arrangement, this predetermined potential level is zero potential. In such an arrangement it is required that the electron gun 11 of the assembly is at a high negative potential level, for example, of 5000 volts. The other, common electrode 25 may be connected to any convenient point within the electron beam tube assembly to be maintained at zero potential. Conveniently, as shown, each conductor of the pattern, at its end remote from its exposed end, is coupled to a conductive coating 26 conventionally provided on the outside of the tube envelope, and to be maintained at zero potential.

It is not essential that the potential level of a conductor is changed to $-5000$ volts by the electron beam impinging upon the conductor, in order that an electrical discharge is obtained between the pair of electrodes including the exposed end of the conductor, possibly, the arrangement being such that a potential difference of only 1000 volts between the pair of electrodes is required to obtain the electrical discharge. Hence, the conductor may be changed to any potential level between $-1000$ volts, and $-5000$ volts by the electron beam impinging on the conductor.

When the electron beam impinges upon the conductor, in order to prevent a simultaneous discharge from the conductor to the external conductive coating 26 on the tube envelope, preventing a desired electrical discharge taking place between the pair of electrodes including the exposed end of the conductor, a resistor is provided between the end of the conductor remote from the exposed end and the external conductive coating, the resistor having a sufficient magnitude for this purpose. Such a resistor is required to be connected to each conductor of the pattern, and in the illustrated arrangement such resistors are provided by a continuous layer of resistive material 28 deposited on part of the face plate of the electron beam tube, the layer 28 extending between the appropriate ends of the conductors of the pattern and the external conductive coating 26.

A web 30 of material sensitive to electrical discharges, for example, comprising carbon between two paper sheets, is arranged to move through the electron beam tube assembly between two reels 31, the take-up reel being driven at a required speed by means (not shown). The web 30 of material passes, in a continuous movement, adjacent to the longitudinal edge 18 of the face plate spaced from the envelope 13. In particular, there is a portion 34 of the moving web 30 instantaneously adjacent to the exposed conductor ends 22, and intermediate between each pair of electrodes, at any particular time, and the exposed conductor ends extend along the axis of this instantaneous adjacent portion of the web. The width of the web 30 extends parallel to the exposed conductor ends 22, and the direction of movement of, at least the instantaneous adjacent portion 34, of the web is transverse to the edge 18 of the face plate. The conductors 20 extend normal to the instantaneous adjacent portion 34 of the web; and the exposed conductor ends are at least substantially uniformly spaced from the instantaneous adjacent portion 34 of the web. When an electrical discharge occurs selectively between the exposed end 22 of a conductor and the other, common electrode 25, the instantaneous adjacent portion 34 of the moving web 30 selectively is marked.

The electron beam within the tube 10 is indicated generally at 40, in FIG. 1. The electron beam deflection means, indicated generally at 41, and of a conventional construction, is capable of causing the beam to scan in a straight line along the longitudinal axis of symmetry 19 of the part 17 of the envelope 13, and in a uniformly repetitive manner. Thus, the electron beam 40 can impinge upon each conductor 20 of the pattern in turn, in a scanning period, between consecutive scanning periods there being a short fly-back time.

In operation, in each scanning period, intermittent information signals can be supplied to control the electron beam modulation means, comprising the cathode 42, of the tube 10, and the electron beam 40 is caused to impinge upon selected conductors 20 in the scanning period. Thus, in each scanning period, discrete marks are obtained on only the parts of the portion of the moving web instantaneously opposite to the exposed conductor ends of the selected conductors upon which the electron beam impinges. Hence, there is obtained on the moving web representations of the information signals supplied to the assembly, and the discrete marks are obtained whilst the assembly is in operation, and the associated web is moving through the assembly. The electron beam modulation means 42 is arranged to be controlled such that the electron beam does not impinge upon any conductor during the fly-back times between consecutive scanning periods.

The arrangement is such that the information signals are synchronised with the operation of the electron beam deflection means 41; and each constituent information signal is such that only one corresponding electrical discharge is caused.

The means to provide the intermittent information signals to be represented is not shown, but such means is connected to the pins 43 of the tube 10 extending through the member 44 sealing the neck 12 of the envelope.

Thus, a simple and compact electron beam assembly is obtained, in which representations of supplied information signals are obtained, the representations comprising discrete marks on a web of material sensitive to electrical discharges moved through the assembly.

Interface means, not shown, may be provided within the assembly between the sources of the information signals and the remainder of the electron tube assembly, to ensure that the information signals supplied to the remainder of the assembly are of the appropriate form.

In order to reduce the effects of wear, due to electrical discharges, of the exposed conductor ends 22, the conductor parts 23 providing these exposed conductor ends are of a material of a higher wear resistance to electrical discharges, than the remainder of the conductors. In addition, the conductor parts providing the exposed conductor ends are readily detachable from the remainder of the conductors so that these conductors parts 23 are readily replaceable after wear due to electrical discharges. Thus, the conductor parts 23 providing the exposed ends 22 are printed onto a support 50, and these conductor parts are arranged to be readily detachably secured to other conductor parts beyond the tube envelope and supported on the face plate 16, in addition to providing the exposed conductor ends.

The parts of the conductors providing the exposed conductor ends are substantially enclosed, except for the exposed conductor ends. Alternatively, the exposed conductor ends are at least partially unsupported by the face plate or by any other support.

The electron beam tube 10 provided within the assembly has a screen including a suitable phosphor 52, indicated only in FIG. 2, on the surface 21 of the face plate 16 within the envelope 13, and a visible indication of the different instantaneous electron beam impingement points on the screen is obtained.

The pattern of conductors, at least partially provided on the face plate, may have any desired form. The illustrated pattern corrects for any non-uniformity in the scanning action of the electron beam over the conductors. Usually the arrangement is such that the electron beam cannot impinge on more than one conductor simultaneously.

The resistors, required between the pattern of conductors, and the point within the assembly to be maintained at a predetermined potential level, and to which point the pattern of conductors is to be coupled, may be deposited in any convenient way within the electron beam tube assembly.

It is not essential that the other, common electrode and the conductors of the pattern upon which the electron beam is not impinging are to be maintained at zero potential; nor that they are to be maintained at the same predetermined potential level.

The information signals to be represented may be supplied to control the electron beam deflection means, instead of, or in addition to, the electron beam modulation means. Thus, the electron beam is not capable of scanning across the conductor pattern in a uniformly repetitive manner, but instead, the deflection of the beam is controlled, at least partially, by the information signals. Hence, there is no scanning period associated with the electron beam deflection; and it may be convenient to synchronise the intermittent information signals with the movement of the web through the assembly. The arrangement also maybe such that the electron beam does not move in a straight line across the face plate, there being electron beam deflection means to control the movement of the electron beam in two coordinate axes, and such movement is at least partially in response to the information signals.

The arrangement may be such that the required representations of the information signals do not comprise merely discrete marks on the web, but each comprises some character, such as an alphanumeric character, formed from a plurality of discrete marks.

The information signals, in addition to being synchronised with the movement of the web through the assembly, may also control such movement, and this movement may be bi-directional.

The face plate may not be planar.

The part of the envelope which abuts against the face plate may have any convenient shape.

The conductors may extend to more than one edge of the face plate.

The periphery of the face plate may have any convenient shape.

The exposed conductor ends may not extend in a straight line, along an axis of the instantaneous adjacent portion of the associated sheet; and/or are not uniformly spaced apart; either to reduce, or to increase, distortion in the obtained representations of the information signals.

Usually the exposed conductor ends, when extending in a straight line, do not extend exactly transversely to the direction of movement of the web through the assembly, when the movement of the web is continuous, but is inclined thereto, in order to compensate for the continuous web movement.

Sheets of the material sensitive to electrical discharges may be provided instead of the web. Alternatively, a web can be considered to be a sheet of material, and for convenience in this specification and the accompanying claims a web will be so considered.

The sheets of material, or the web, may move in an intermittent manner, possibly in synchronisation with the information signals, instead of moving in a continuous manner, through the electron beam tube assembly.

What we claim is:

1. An electrostatic printer including an electron beam tube assembly having an electron beam tube with a tube envelope and having a pattern of a plurality of discrete conductors at least partially provided by being deposited on one surface of an initially separate face plate of the tube envelope, the conductor bearing surface of the face plate being secured to the remainder of the tube envelope, the conductors to extend from within the envelope of the electron beam tube at least to an edge of the face plate spaced from the remainder of the envelope, there being an array of exposed, spaced apart ends of the conductors beyond the remainder of the envelope, each conductor providing only one such exposed end, and each conductor is coupled to a point to be maintained at a high positive predetermined potential level, with respect to the cathode, by being coupled, via resistive material also deposited on the tube envelope, to a conductive coating provided on the remainder of the tube envelope and to be maintained at the predetermined potential level, each exposed end of a conductor individually comprising one electrode of a pair of electrodes, there being a plurality of pairs of electrodes, with the exposed ends of different conductors being in different pairs of electrodes, and another, common electrode is provided for the different pairs of electrodes, the electrodes of each pair of electrodes are at least substantially uniformly spaced apart, and means is provided within the electron beam tube assembly to move an associated sheet of material sensitive to electrical discharges between each of the different pairs of electrodes, and the arrangement is such that the potential level of a conductor is changed from said predetermined potential level by the electron beam impinging thereon, and each such change in the potential level of a conductor causes an electrical discharge to occur between the pair of electrodes having as one electrode the exposed end of the conductor upon which the electron beam is impinging, such electrical discharges to occur between different pairs of electrodes to mark different parts of different adjacent portions of the moving sheet, and the electron beam tube assembly includes a source of information signals connected to the electron beam tube in operation, with the sheet moving between each of the different pairs of electrodes, and in response to information signals supplied to the electron beam tube, an electrical discharge to occur selectively between a pair of electrodes, and as the electron beam impinges on different parts of the face plate of the tube, with the electron beam impinging on different conductors of the pattern, electrical discharges to occur selectively between different pairs of electrodes, and in relation to each pair of electrodes individually, electrical discharges to occur between the pair of electrodes at different times, providing marks on the different corresponding parts of the different instantaneous adjacent portions of the moving sheet, the marks so provided on the sheet providing desired representations of the information signals supplied to the assembly.

2. An assembly as claimed in claim 1 having an arrangement such that said other, common electrode, and each conductor of the pattern upon which the electron beam is not impinging are to be maintained at substantially the same predetermined potential level.

3. An assembly as claimed in claim 1 having electron beam deflection means arranged such that the electron beam is capable of movement only in a straight line across the face plate in response to the receipt by the electron beam deflecting means of the information signals.

4. An assembly as claimed in claim 1 having electron beam modulation means and the information signals are to be supplied to the electron beam modulation means.

5. An assembly as claimed in claim 4 in which the arrangement is such that the electron beam is capable of scanning linearly across the face plate in a uniformly repetitive manner.

6. An assembly as claimed in claim 1 in which the face plate provides a screen for the electron beam tube, a suitable phosphor for the screen being provided to coat the part of the surface of the face plate within the tube envelope, the screen providing a visible indication of the different instantaneous electron beam impingement points on the screen.

7. An assembly as claimed in claim 1 in which the parts of the conductors providing the exposed conductor ends are of a material more resistant to wear due to electrical discharges than the material of the remainder of the conductors.

8. An assembly as claimed in claim 1 in which the parts of the conductors providing the exposed conductor ends are readily replaceable.

9. An assembly as claimed in claim 1 in which the array of spaced apart, exposed conductor ends of the pattern of conductors extend at least substantially in a straight line.

10. An assembly as claimed in claim 9 in which the array of spaced apart, exposed conductor ends of the pattern of conductors extend at least substantially transversely to the direction of movement of the instantaneous adjacent portion of the associated sheet.

11. An assembly as claimed in claim 1 in which at least the conductor parts providing the exposed conductor ends extend at least substantially normal to the instantaneous adjacent portion of the sheet.

12. An assembly as claimed in claim 1 in which all the constituent conductors of the pattern extend at least substantially parallel to each other.

* * * * *